(12) United States Patent
Kochura et al.

(10) Patent No.: US 11,488,240 B2
(45) Date of Patent: Nov. 1, 2022

(54) DYNAMIC CHATBOT SESSION BASED ON PRODUCT IMAGE AND DESCRIPTION DISCREPANCY

(71) Applicant: International Business Machines Corporation, Armonk, NY (US)

(72) Inventors: Nadiya Kochura, Bolton, MA (US); Shikhar Kwatra, San Jose, CA (US); Indervir Singh Banipal, Austin, TX (US); Sourav Mazumder, Contra Costa, CA (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 17/026,606

(22) Filed: Sep. 21, 2020

(65) Prior Publication Data

US 2022/0092683 A1    Mar. 24, 2022

(51) Int. Cl.
 *G06Q 30/06* (2012.01)
 *G06N 3/04* (2006.01)
 *H04L 51/02* (2022.01)
 *G06F 40/30* (2020.01)

(52) U.S. Cl.
 CPC ......... *G06Q 30/0643* (2013.01); *G06F 40/30* (2020.01); *G06N 3/04* (2013.01); *H04L 51/02* (2013.01)

(58) Field of Classification Search
 CPC ....... G06Q 30/0643; G06F 3/04; G06F 40/30; H04L 51/02
 See application file for complete search history.

(56) References Cited

U.S. PATENT DOCUMENTS

| 8,015,143 | B2 | 9/2011 | Estes |
| 8,321,197 | B2 | 11/2012 | Gaudet |
| 8,949,377 | B2 | 2/2015 | Makar |
| 9,213,687 | B2 | 12/2015 | Au |
| 9,684,851 | B2 | 6/2017 | Abdulkader |

(Continued)

OTHER PUBLICATIONS

Anonymous at al., "Learning Information Extraction from Images of Structured Documents Using Synthetic Data and Conditional Random Field", Intuit®: Official Blog, United States, Apr. 2, 2019, 1 Page.

(Continued)

*Primary Examiner* — Seth A Silverman
(74) *Attorney, Agent, or Firm* — Stephanie L. Carusillo

(57) ABSTRACT

In an approach for initiating a chatbot session responsive to determining a product image and product description discrepancy, a processor, responsive to a user browsing a product listing for a product on an ecommerce website, processes a product description of the product listing using natural language processing (NLP) to generate a list of actor-subject negations from the product description. A processor processes a set of product images of the product listing to generate a list of entities from the set of product images. A processor correlates the list of actor-subject negations from the product description and the list of entities from the set of product images. A processor identifies at least one discrepancy between at least one actor-subject negation and at least one entity. A processor initiates, while the user is still browsing the product listing, a chat session with a chatbot of the ecommerce website.

20 Claims, 3 Drawing Sheets

(56) References Cited

U.S. PATENT DOCUMENTS

| | | |
|---|---|---|
| 2014/0279050 A1 | 9/2014 | Makar |
| 2018/0068012 A1* | 3/2018 | O'Connor ........... G06F 16/5854 |
| 2018/0075014 A1 | 3/2018 | Duan |
| 2018/0189857 A1* | 7/2018 | Wu ......................... G06F 40/30 |
| 2022/0050968 A1* | 2/2022 | Xie ....................... G06F 40/216 |

OTHER PUBLICATIONS

Anonymous et al., "Object Recognition—3 things you need to know", The MathWorks, Inc., Image Processing and Computer Vision, MATLAB & Simulink, United States, Jul. 7, 2020, 8 Pages.

Bozbura et al., "Detection of e-Commerce Anomalies using LSTM-recurrent Neural Networks", in Proceedings of the 8th International Conference on Data Science, Technology and Applications (Data 2019), DOI: 10.5220/0007924502170224, ISBN: 978-989-758-377-3, Scitepress—Science and Technology Publications, Lda, 2019, 16 Pages.

Chaudhuri, Abon, "Smart Image Analysis for Omnichannel Retail Applications", Open Data Science, United States, Aug. 7, 2019, 7 Pages.

Chavan et al., "Identify information in document images—A composite code pattern", GitHub, Inc., United States, Nov. 30, 2018, 12 Pages.

IBM, "Annotation Query Language (AQL) reference", IBM Knowledge Center, United States, 1 Page.

IBM, "How to build a chatbot for your business", United States, Jul. 7, 2020, 8 Pages.

IBM, "Introduction to IOP and BigInsights", IBM Knowledge Center, United States, 2 Pages.

IBM, "Watson Assistant", United States, Jul. 7, 2020, 11 Pages.

Kwiatkowski et al., "Natural Questions: a New Corpus and Challenge for Question Answering Research", Google AI Blog, United States, Jan. 23, 2019, 3 Pages.

Martinelli et al., "Create a retail chatbot by using IBM Watson services", IBM Cloud Architecture Center, Jul. 7, 2020, 35 Pages.

More, Ajinkya, "Product Matching in eCommerce using deep learning", Medium, United States, Sep. 11, 2017, 21 Pages.

Olafenwa, Moses, "Object Detection with 10 lines of code", Towards Data Science, Jun. 16, 2018, 14 Pages.

Ramakrishnan et al., "Anomaly Detection for an E-Commerce Pricing System", in Proceedings of the 25th ACM SIGKDD International Conference on Knowledge Discovery & Data Mining, arXiv:1902.09566v5, [cs.LG], Jun. 1, 2019, 10 Pages.

Rupanagunta, Krishna, "How to prevent a website error from becoming an e-commerce fiasco" Digital Commerce 360, Vertical Web Media LLC, Mu Sigma, India, Nov. 11, 2016, 5 Pages.

Sarshogh et al., "Learning to Read: Computer Vision Methods for Extracting Text from Images", Capital One Tech, United States, Jan. 29, 2019, 12 Pages.

Serban et al., "Generating Factoid Questions With Recurrent Neural Networks:The 30M Factoid Question-Answer Corpus", arXiv:1603.06807v2, [cs.CL], University of Montreal, Canada, May 29, 2016, 13 Pages.

Wikipedia, "IBM SystemT", United States, Dec. 4, 2019, 2 Pages.

Wikipedia, "Simple interactive object extraction", United States, Feb. 24, 2020, 2 Pages.

Wu et al., "Automatic object extraction from images using deep neural networks and the level-set method", IET Image Processing, vol. 12, No. 7, pp. 1131-1141, doi: 10.1049/iet ipr.2017.1144, 2018, 11 Pages.

\* cited by examiner

DYNAMIC CHATBOT SESSION BASED ON PRODUCT IMAGE AND DESCRIPTION DISCREPANCY

BACKGROUND

The present invention relates generally to the field of chatbots, and more particularly to initiating a chatbot session responsive to determining a product image and product description discrepancy.

A chatbot is a computer program that simulates conversation with human users to complete some sort of service. Companies today can use chatbots to instantly communicate with customers and resolve any issues. These round-the-clock bots use artificial intelligence (AI) to infer customers' preferences a create a valuable, individualized shopping experience. With the growing demand in ecommerce, chatbots can help companies meet their customers' wants to create a personal and helpful shopping experience. Chatbots for ecommerce companies are typically designed to complete buyers' purchases, offer buyers product recommendations, and provide customer support.

SUMMARY

Aspects of an embodiment of the present invention disclose a method, computer program product, and computer system for initiating a chatbot session responsive to determining a product image and product description discrepancy. Responsive to a user browsing a product listing for a product on an ecommerce website, a processor processes a product description of the product listing using natural language processing (NLP) to generate a list of actor-subject negations from the product description. A processor processes a set of product images of the product listing to generate a list of entities from the set of product images. A processor correlates the list of actor-subject negations from the product description and the list of entities from the set of product images. A processor identities at least one discrepancy between at least one actor-subject negation and at least one entity. A processor initiates, while the user is still browsing the product listing, a chat session with a chatbot of the ecommerce website.

In some aspects of an embodiment of the present invention, an actor-subject negation is when an action is not to be performed by an actor on a subject, wherein the actor is the product of the product listing and the subject is an entity on which the actor is deemed to act upon.

In some aspects of an embodiment of the present invention, correlating the list of actor-subject negations from the product description and the list of entities from the set of product images is completed using semantic similarity matching test.

In some aspects of an embodiment of the present invention, identifying the at least one discrepancy between the at least one actor-subject negation and the at least one entity is based on the semantic similarity matching test.

In some aspects of an embodiment of the present invention, a processor generates a natural language prompt to begin the chat session with by feeding the at least one discrepancy into recurrent neural network as a fact.

In some aspects of an embodiment of the present invention, processing the product description and processing the set of product images is done simultaneously.

In some aspects of an embodiment of the present invention, a processor notifies a content manager of the ecommerce website on which the product listing is listed of the at least one discrepancy.

DETAILED DESCRIPTION

Embodiments of the present invention recognize the growing number of ecommerce transactions and product listings on ecommerce websites. With this growing number, ecommerce websites will want to ensure their customers are happy with their online shopping experience and will shop on their website again. Embodiments of the present invention recognize that a discrepancy or inconsistency between a product description and product images in a product listing can cause negative customer experiences.

For example, while browsing an online shopping website, a shopper views a product listing for a frying pan and reads the product description which states that the pan is not compatible with induction stove tops. Then, the shopper scrolls through the product images and sees the pan being used on an induction stove top on one of the images. The shopper is now confused, and even though the shopper may like the product, the shopper is still unsure if the pan can be used on an induction stove top. Therefore, embodiments of the present invention recognize the need for a system that can evaluate the overall product listing, including any product description and product images, to make sure there are not contradictions or inconsistencies.

Embodiments of the present invention provide a system and method for, responsive to determining a discrepancy, inconsistency, and/or contradiction between a product image and product description of a product listing on an ecommerce website, initiating a chatbot session to resolve customer confusion. Embodiments of the present invention provide a system and method for autogenerating a chatbot equipped with necessary information and configuration to clarify any confusion caused by the discrepancy, inconsistency, and/or contradiction between the product description and product images. Embodiments of the present invention identify the discrepancy, inconsistency, and/or contradiction in real-time during a shopper's ecommerce website browsing session. Embodiments of the present invention interactively address the discrepancy, inconsistency, and/or contradiction by using a chatbot agent that communicates on behalf of the shopper with the website's chatbot. Embodiments of the present invention further provide for notifying an owner of a product listing and/or content manager of the ecommerce website of the discrepancy, inconsistency, and/or contradiction between a product image and product description.

The present invention will now be described in detail with reference to the Figures.

Figure 1:
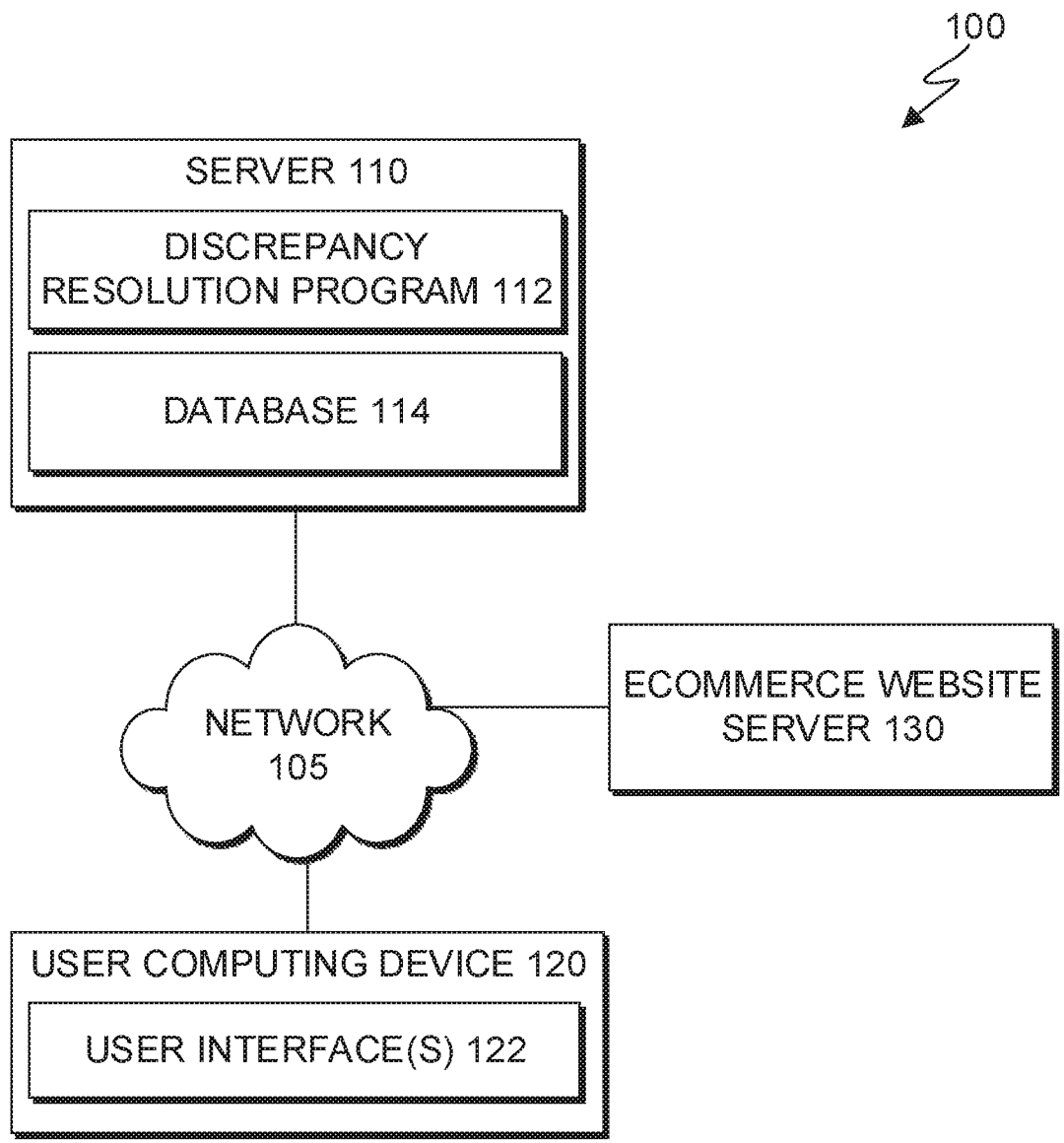
FIG. 1 depicts a block diagram of a distributed data processing environment, in accordance with an embodiment of the present invention.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110, user computing device 120, and ecommerce website server 130 interconnected over network 105. In an embodiment, distributed data processing environment 100 represents a system that constructs machine learning models for recommending products to a user. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110, user computing device 120, and ecommerce website server 130. Distributed data processing environment 100 may include additional servers, computers, or other devices not shown.

Server 110 operates to run discrepancy resolution program 112. In the depicted embodiment, server 110 contains discrepancy resolution program 112 and database 114. In some embodiments, server 110 can be a standalone computing device, a management server, a web server, or any other electronic device or computing system capable of receiving, sending, and processing data and capable of communicating with user computing device 120 and ecommerce website server 130 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Discrepancy resolution program 112 operates to initiate a chatbot session responsive to determining a product image and product description discrepancy. In an embodiment, discrepancy resolution program 112 is initiated for each product listing webpage on an ecommerce website opened, viewed, and/or browsed by a user that has opted-in to discrepancy resolution program 112. For example, responsive to a user of user computing device 120 opening a product listing page for a standing mirror on an online shopping website run from ecommerce website server 130, discrepancy resolution program 112 begins. In the depicted embodiment, discrepancy resolution program 112 resides on server 110 with user interface 122 being a local app interface of discrepancy resolution program 112 running on user computing device 120. In other embodiments, discrepancy resolution program 112 may be run locally on user computing device 120 or on another device (not shown) provided that discrepancy resolution program 112 has access to network 105. In yet other embodiments, certain steps of discrepancy resolution program 112 can be run on server 110 and other steps discrepancy resolution program 112 can be run on user computing device 120 through user interface 122 provided that discrepancy resolution program 112 has access to network 105 to exchange information between server 110, user computing device 120, and ecommerce website server 130. Discrepancy resolution program 112 is described in more detail below with reference to FIG. 2.

Database 114 operates as a repository for data received, used, and/or output by discrepancy resolution program 112. Data received, used, and/or generated may include, but is not limited to, a question and answer (Q&A) corpus; and any data received, used, and/or output by discrepancy resolution program 112. Database 114 can be implemented with any type of storage device capable of storing data and configuration files that can be accessed and utilized by server 110, user computing device 120, and/or ecommerce website server 130, such as a hard disk drive, a database server, or a flash memory. In an embodiment, database 114 is accessed by discrepancy resolution program 112, user computing device 120, and/or ecommerce website server 130 to store and/or to access the data. In another embodiment, database 114 may reside on another computing device, server, cloud server, or spread across multiple devices elsewhere (not shown) within distributed data processing environment 100, provided that database 114 has access to network 105.

User computing device 120 operates as a computing device associated with one or more users that can send and receive data. In some embodiments, user computing device 120 may be, but is not limited to, an electronic device, such as a laptop computer, a tablet computer, a netbook computer, a personal computer (PC), a desktop computer, a smart phone, a wearable computing device, or any programmable electronic device capable of running user interface 122 and communicating (i.e., sending and receiving data) with server 110 and/or ecommerce website server 130 via network 105. In some embodiments, user computing device 120 represent programmable electronic devices or combination of programmable electronic devices capable of executing machine readable program instructions and communicating with server 110, ecommerce website server 130, and/or other computing devices (not shown) within distributed data processing environment 100 via a network, such as network 105. In an embodiment, user computing device 120 represents one or more devices associated with one or more users. In the depicted embodiment, user computing device 120 includes respective user interface 122. User computing device 120 may include components as described in further detail in FIG. 3.

User interface 122 operates as a local user interface on user computing device 120 through which one or more users of user computing device 120 interact with user computing device 120. In some embodiments, user interface 122 is a local app interface of discrepancy resolution program 112 on user computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from discrepancy resolution program 112 via network 105. In an embodiment, user interface 122 enables a user to send and receive data (i.e., to and from discrepancy resolution program 112 via network 105, respectively). In an embodiment, user interface 122 enables a user to opt-in to discrepancy resolution program 112.

Ecommerce website server 130 operates to run an ecommerce web application that is accessed by a user of user computing device 120. In some embodiments, ecommerce website server 130 can be a standalone computing device, a management server, a web server, or any other electronic device or computing system capable of receiving, sending, and processing data and capable of communicating with user computing device 120 and/or server 110 via network 105. In other embodiments, ecommerce website server 130 represents a server computing system utilizing multiple computers as a server system, such as a cloud computing environment. In yet other embodiments, ecommerce website server 130 represents a computing system utilizing clustered computers and components (e.g., database server computers, application server computers, etc.) that act as a single pool of seamless resources when accessed within distributed data processing environment 100. Ecommerce website server 130 may include components as described in further detail in FIG. 3.

Figure 2:
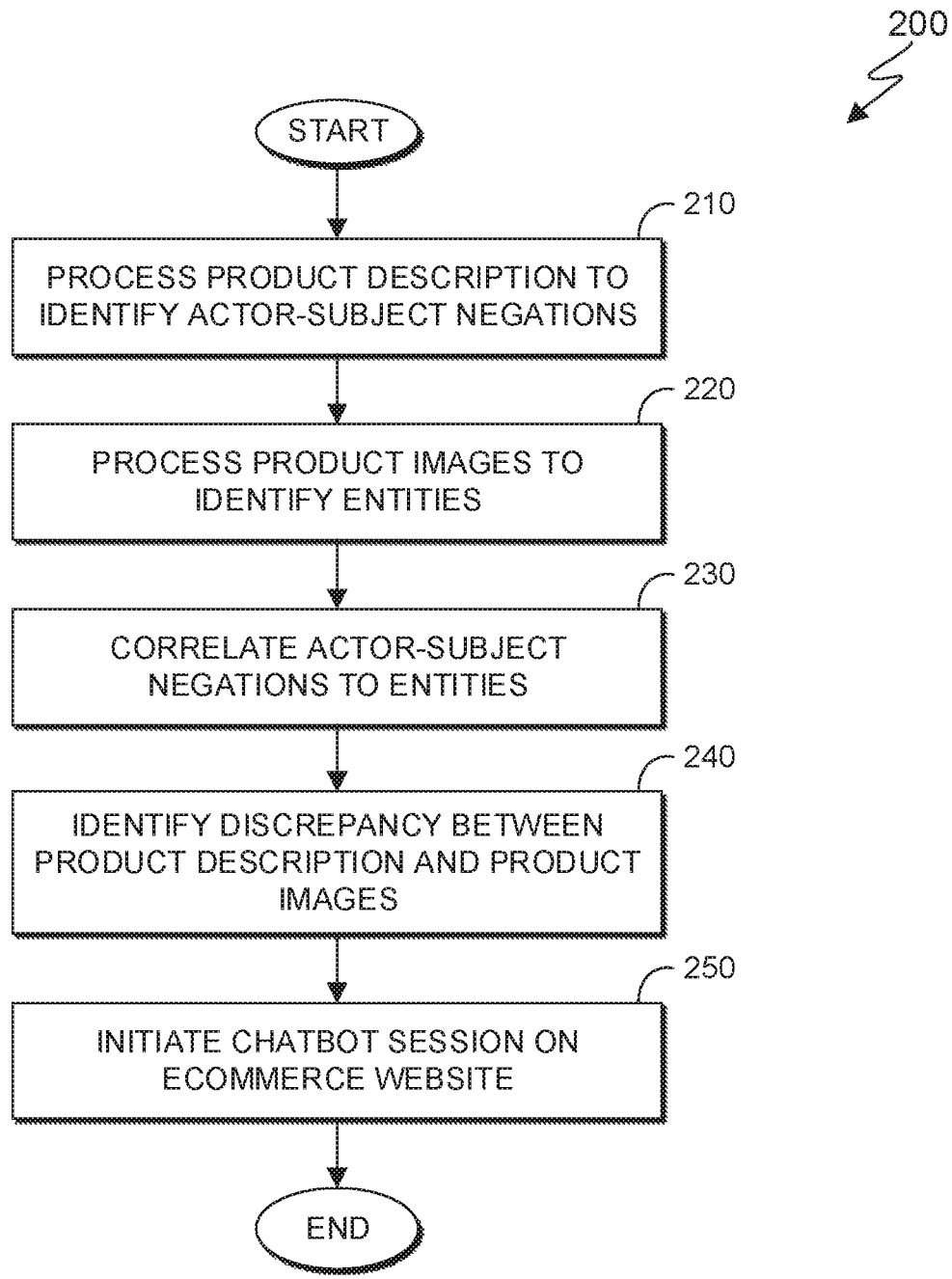
FIG. 2 depicts a flowchart of the steps of a discrepancy resolution program, for initiating a chatbot session responsive to determining a product image and product description discrepancy, in accordance with an embodiment of the present invention.

FIG. 2 depicts a flowchart 200 of the steps of discrepancy resolution program 112, for initiating a chatbot session responsive to determining a product image and product description discrepancy, in accordance with an embodiment of the present invention. In an embodiment, discrepancy resolution program 112 processes a product description, classifies product images, correlates the product images with the product description, identifies a discrepancy between at least one of the product images and the product description, and initiates a chat session with a chatbot of the ecommerce website. It should be appreciated that the process depicted in FIG. 2 illustrates one possible iteration of discrepancy resolution program 112, in which discrepancy resolution program 112 is initiated for each product listing webpage opened by a user on an ecommerce website.

In step 210, discrepancy resolution program 112 processes a product description. In an embodiment, discrepancy resolution program 112 processes a product description of the product listing that the user is browsing on an ecommerce website. The product description of a product listing includes textual descriptions of the product. In an embodiment, discrepancy resolution program 112 processes the product description using natural language processing (NLP) techniques. In an embodiment, discrepancy resolution program 112 crawls through the product description to process the textual descriptions using NLP to generate actor-subject negation mappings of the textual descriptions.

An actor-subject negation mapping includes an actor, subject, action(s), and negation. The actor is the product of the product listing that the user is browsing. The subject is the entity on which the actor is deemed to act upon. The action(s) are the one or more actions the actor can take on the subject. A negation is when an action is not to be performed by the actor on the subject. In an embodiment, discrepancy resolution program 112 generates a table of actor-subject negation mappings from the product description, e.g., "The actors which perform certain actions on the subjects in negation; and where the actors match with the entities as extracted from the product description as the main actors". Using the frying pan example from above, discrepancy resolution program 112 identifies an actor-subject negation from the product description that the frying pan cannot be used on an induction stove top, with the frying pan being the actor, the induction stove top being the subject, and the negative action that the frying pan cannot be used on an induction stove top being the negation. In an embodiment, discrepancy resolution program 112 will use a list of the actor-subject negations later to compare against entities extracted from product images from the product listing. In an embodiment, discrepancy resolution program 112 stores the table of actor-subject negation mappings in a database, e.g., database 114.

In step 220, discrepancy resolution program 112 processes a set of product images and/or videos. In an embodiment, discrepancy resolution program 112 processes a set of product images and/or videos from the product listing that the user is browsing on the ecommerce website. In an embodiment, responsive to processing the product description, discrepancy resolution program 112 processes the set of product images and/or videos. In some embodiments, discrepancy resolution program 112 processes the product description and the set of product images and/or videos simultaneously. In an embodiment, discrepancy resolution program 112 processes the set of product images and/or videos using object recognition and/or entity extraction and aggregation to identify entities and their relationship to an action from the set of product images and/or videos. In an embodiment, discrepancy resolution program 112 uses a deep neural network and level-set method to perform automatic object extraction from the set of product images and/or videos to identify the entities. Continuing the frying pan example, discrepancy resolution program 112 identifies an induction stove top with the frying pan on it in one of the product images.

In step 230, discrepancy resolution program 112 correlates the product images and/or videos with the product description. In an embodiment, responsive to processing the product description and the set of product images and/or videos, discrepancy resolution program 112 correlates the product images and/or videos with the product description. In an embodiment, discrepancy resolution program 112 correlates the product images and/or videos with the product description by performing a semantic similarity matching test between the entities from the product description and the entities extracted from the set of product images and/or videos. In an embodiment, discrepancy resolution program 112 uses the list of actor-subject negations from the product description to compare against each of the entities from the set of product images and/or videos.

In step 240, discrepancy resolution program 112 identifies a discrepancy between at least one of the product images and/or videos and the product description. In an embodiment, responsive to correlating the product images and/or videos with the product description, discrepancy resolution program 112 identifies at least one discrepancy between at least one of the product images and/or videos and the product description. In an embodiment, based on the semantic similarity matching test between the entities in the product description and the entities in the set of product images and/or videos, discrepancy resolution program 112 identifies at least one actor-subject negation that matches or correlates to an entity from the set of product images and/or videos. Continuing the frying pan example, discrepancy resolution program 112 identifies that the actor-subject negation from the product description that the frying pan is not to be used on an induction stove top correlates to the product image with the frying pan on an induction stove top.

In step 250, discrepancy resolution program 112 initiates a chat session with a chatbot of the ecommerce website. In an embodiment, responsive to identifying at least one discrepancy between at least one of the product images and the product description, discrepancy resolution program 112 automatically initiates a chat session with a chatbot of the ecommerce website. In an embodiment, discrepancy resolution program 112 initiates a chat session with a chatbot of the ecommerce website while the user is browsing the product listing. In an embodiment, discrepancy resolution program 112 initiates a chat session with a chatbot of the ecommerce website upon the user adding the product to a shopping cart of the ecommerce website. In an embodiment, discrepancy resolution program 112 feeds the at least one discrepancy into a Q&A corpus to generate necessary information/inputs text in the form of a question to begin the chat session with the chatbot of the ecommerce website. In an embodiment, discrepancy resolution program 112 feeds the at least one discrepancy as facts in a recurrent neural network (RNN) to transduce the facts into a natural language prompt, e.g., questions and responses, to use in the chat session.

In some embodiments, discrepancy resolution program 112 runs a Text and Image Information based Convolutional Neural Network (TI-CNN) to process and correlate the product description and the set of product images and/or videos. In an embodiment, discrepancy resolution program 112 uses the TI-CNN to perform a text-image correlation check in order to identify at least one discrepancy between the product description and the set of product images and/or videos. The TI-CNN uses two parallel CNNs to extract explicit and latent features from the text of the product description and explicit and latent features from the image and/or video information of the set of product images and/or videos, respectively, and then project the explicit and latent features into a unified feature space to form a new representation of the text, images, and/or videos. In an embodiment, discrepancy resolution program 112 concatenates the outputs from each CNN, uses an activation layer and dense layer to transform the output into two dimensions, and uses a final sigmoid activation layer to give the final output label of whether there is a discrepancy between the product description and the set of product images and/or videos.

In some embodiments, discrepancy resolution program 112 compares the text information and image and/or video information via semantic text similarity and image similarity with online sources using a web scraping module. Generally, web scraping deals with extracting data automatically with the help of web crawlers. Web crawlers are scripts that connect to the world wide web using the HTTP protocol and allows you to fetch data in an automated manner. The TI-CNN used is trained through web scaping of product catalogs from major online retailers injecting product images and corresponding product textual description for each product in the product catalogs. In an embodiment, discrepancy resolution program 112 matches the text, image, and/or video information with other information from the online sources using an aggregation model that uses the trained TI-CNN model. For example, pseudo code for the aggregation model can be:

```
A1= text_branch_extracted + func(text_branch_extracted,
text_branch_scraped)
A2 = image_branch_extracted + func(image_branch_extracted,
image_branch_scraped)
If A1 is confirmed, weight associated with A1 is increased:
    Loop to A2 for confirmation:
        If A2 ==true:
            Call TI-CNN module function →
            chatbot_not_initiated
        Else:
        Chatbot_initiate
```

In some embodiments, discrepancy resolution program 112 notifies a content manager of the ecommerce website on which the product listing is and/or an owner (i.e., a seller of the product) of the product listing of the discrepancy. In these embodiments, responsive to identifying a discrepancy between at least one of the product images and/or videos and the product description, discrepancy resolution program 112 notifies a content manager of the ecommerce website on which the product listing is and/or an owner of the product listing of the at least one discrepancy.

Figure 3:
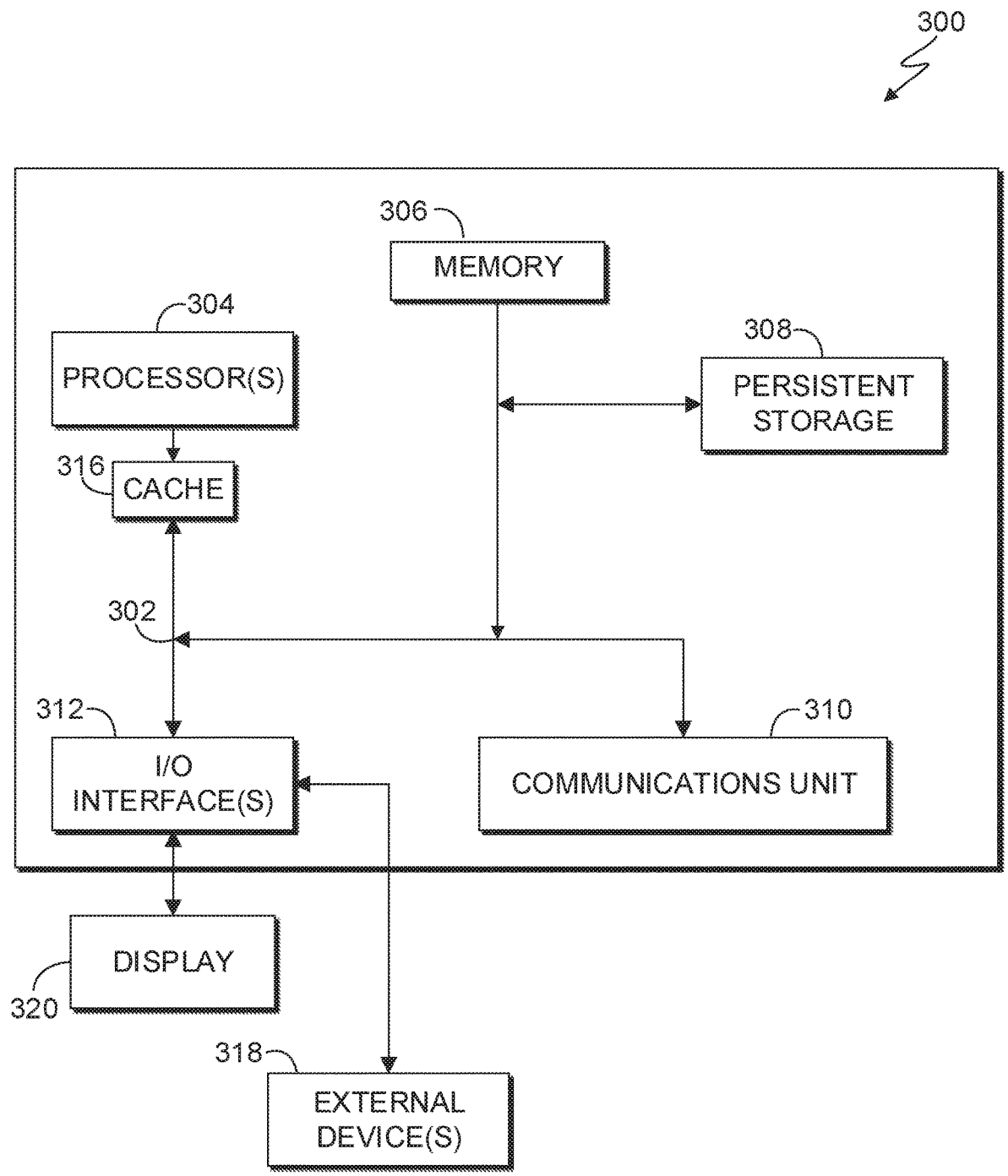
FIG. 3 depicts a block diagram of a computing device of the distributed data processing environment, in accordance with an embodiment of the present invention.

FIG. 3 depicts a block diagram of components of computing device 300 suitable for server 110, user computing device(s) 120, and/or IoT device(s) 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110, user computing device 120, and/or ecommerce website server 130. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to a user browsing a product listing for a product on an ecommerce website, processing, by one or more processors, a product description of the product listing using natural language processing (NLP) to generate a list of actor-subject negations from the product description;
processing, by the one or more processors, a set of product images of the product listing to generate a list of entities from the set of product images;
correlating, by the one or more processors, the list of actor-subject negations from the product description and the list of entities from the set of product images;
identifying, by the one or more processors, at least one discrepancy between at least one actor-subject negation and at least one entity; and
initiating, by the one or more processors, while the user is still browsing the product listing, a chat session with a chatbot of the ecommerce website.

2. The computer-implemented method of claim 1, wherein an actor-subject negation is when an action is not to be performed by an actor on a subject, wherein the actor is the product of the product listing and the subject is an entity on which the actor is deemed to act upon.

3. The computer-implemented method of claim 1, wherein correlating the list of actor-subject negations from the product description and the list of entities from the set of product images is completed using semantic similarity matching test.

4. The computer-implemented method of claim 3, wherein identifying the at least one discrepancy between the at least one actor-subject negation and the at least one entity is based on the semantic similarity matching test.

5. The computer-implemented method of claim 1, further comprising:
generating, by the one or more processors, a natural language prompt to begin the chat session with by feeding the at least one discrepancy into recurrent neural network as a fact.

6. The computer-implemented method of claim 1, wherein processing the product description and processing the set of product images is done simultaneously.

7. The computer-implemented method of claim 1, further comprising:
notifying, by the one or more processors, a content manager of the ecommerce website on which the product listing is listed of the at least one discrepancy.

8. A computer program product comprising:
one or more computer readable storage media and program instructions stored on the one or more computer readable storage media, the program instructions comprising:
program instructions to, responsive to a user browsing a product listing for a product on an ecommerce website, process a product description of the product listing using natural language processing (NLP) to generate a list of actor-subject negations from the product description;
program instructions to process a set of product images of the product listing to generate a list of entities from the set of product images;
program instructions to correlate the list of actor-subject negations from the product description and the list of entities from the set of product images;
program instructions to identify at least one discrepancy between at least one actor-subject negation and at least one entity; and
program instructions to initiate, while the user is still browsing the product listing, a chat session with a chatbot of the ecommerce website.

9. The computer program product of claim 8, wherein an actor-subject negation is when an action is not to be performed by an actor on a subject, wherein the actor is the product of the product listing and the subject is an entity on which the actor is deemed to act upon.

10. The computer program product of claim 8, wherein the program instructions to correlate the list of actor-subject negations from the product description and the list of entities from the set of product images is completed using semantic similarity matching test.

11. The computer program product of claim 10, wherein the program instructions to identify the at least one discrepancy between the at least one actor-subject negation and the at least one entity is based on the semantic similarity matching test.

12. The computer program product of claim 8, further comprising:
program instructions to generate a natural language prompt to begin the chat session with by feeding the at least one discrepancy into recurrent neural network as a fact.

13. The computer program product of claim 8, wherein the program instructions to process the product description and the program instructions to process the set of product images are done simultaneously.

14. The computer program product of claim 8, further comprising:
program instructions to notify content manager of the ecommerce website on which the product listing is listed of the at least one discrepancy.

15. A computer system comprising:
one or more computer processors;
one or more computer readable storage media;
program instructions stored on the computer readable storage media for execution by at least one of the one or more processors, the program instructions comprising:
program instructions to, responsive to a user browsing a product listing for a product on an ecommerce website, process a product description of the product listing using natural language processing (NLP) to generate a list of actor-subject negations from the product description;

program instructions to process a set of product images of the product listing to generate a list of entities from the set of product images;

program instructions to correlate the list of actor-subject negations from the product description and the list of entities from the set of product images;

program instructions to identify at least one discrepancy between at least one actor-subject negation and at least one entity; and program instructions to initiate, while the user is still browsing the product listing, a chat session with a chatbot of the ecommerce website.

16. The computer system of claim 15, wherein an actor-subject negation is when an action is not to be performed by an actor on a subject, wherein the actor is the product of the product listing and the subject is an entity on which the actor is deemed to act upon.

17. The computer system of claim 15, wherein the program instructions to correlate the list of actor-subject negations from the product description and the list of entities from the set of product images is completed using semantic similarity matching test.

18. The computer system of claim 17, wherein the program instructions to identify the at least one discrepancy between the at least one actor-subject negation and the at least one entity is based on the semantic similarity matching test.

19. The computer system of claim 15, further comprising:
program instructions to generate a natural language prompt to begin the chat session with by feeding the at least one discrepancy into recurrent neural network as a fact.

20. The computer system of claim 15, further comprising:
program instructions to notify content manager of the ecommerce website on which the product listing is listed of the at least one discrepancy.

* * * * *